United States Patent
Kuo

(10) Patent No.: US 6,716,066 B1
(45) Date of Patent: Apr. 6, 2004

(54) MULTI-MEMORY CARD CONNECTOR

(75) Inventor: Tu-Shui Kuo, Taipei (TW)

(73) Assignee: Jih Vei Electronics Co., Ltd., Taipei Hsien (TW)

( * ) Notice: Subject to any disclaimer, the term of this patent is extended or adjusted under 35 U.S.C. 154(b) by 0 days.

(21) Appl. No.: 10/393,467

(22) Filed: Mar. 21, 2003

(51) Int. Cl.[7] .............................................. H01R 24/00
(52) U.S. Cl. ...................................... 439/630; 361/737
(58) Field of Search ........................... 439/630, 541.5, 439/60, 924.1; 361/735, 737

(56) References Cited

U.S. PATENT DOCUMENTS

| | | | |
|---|---|---|---|
| 6,352,445 B2 * | 3/2002 | Takei et al. | 439/489 |
| 6,386,920 B1 * | 5/2002 | Sun | 439/630 |
| 6,402,529 B2 * | 6/2002 | Saito et al. | 439/74 |
| 6,482,029 B2 * | 11/2002 | Nishimura | 439/541.5 |

* cited by examiner

Primary Examiner—Tho D. Ta
(74) Attorney, Agent, or Firm—Leong C. Lei

(57) ABSTRACT

A multi-memory card connector is disclosed. A multi-memory card connector having a housing, characterized in that the front end of the housing is provided with a slot wherein the upper portion and the lower section of the slot have a different width forming into at least two memory card insertion slot portions, the inner wall of the slot is provided with spaced rows of terminal slot and one end of the terminal slot is positioned at the front and rear opening, another end of the terminal slot is provided with terminal actuating holes and the position thereof matches the position of the memory card metal plate, each of the terminal slot is engageably mounted with a metallic terminal having one end being positioned at the terminal actuating hole and being bent with elasticity, and the other end of the metallic terminal passes through the housing to form into a connector.

2 Claims, 4 Drawing Sheets

US 6,716,066 B1

MULTI-MEMORY CARD CONNECTOR

BACKGROUND OF THE INVENTION (a) Technical Field of the Invention

The present invention relates to multi-memory card connector, and in particular, a connector to connect multi-memory cards to a card reader or writer.

(b) Description of the Prior Art

Common readable and writable storage mediums such as 1.44 diskettes, MO cards, optical discs having low storage capacities but with large volumes do not meet the requirement of a media being small in size and thin, in particular, in a PDA, a digital camera, or a notebook computer.

In order to comply with such requirements, thin, high capacity read/write memory cards have been developed, for example, Smart Media Cards (SM), Memory Stick Cards, Secure Digital Memory Cards, Multi Media Cards etc. Due to the fact that different types of read/write devices need a different memory card, a specific device to read/write the memory card is needed, and therefore, it is a waste of money and it is not convenient to the user.

A read-write device commonly available in the market is a reader with four parts for four different types of memory. However, the structure of this device causes the size of the device to be very large and therefore it is not economical for the user.

Accordingly, it is an object of the present invention to provide a multi-memory card connector which mitigates the above drawbacks.

SUMMARY OF THE INVENTION

Accordingly, it is an object of the present invention to provide a multi-memory card connector wherein the connector is adapted to various types of memory cards, and the size is small and convenient in application.

An aspect of the present invention is to provide a multi-memory card connector having a housing, characterized in that the front end of the housing is provided with a slot wherein the upper portion and the lower section of the slot have a different width forming into at least two memory card insertion slot portions, the inner wall of the slot is provided with spaced rows of terminal slots and one end of the terminal slot is positioned at the front and rear opening, another end of the terminal slot is provided with terminal actuating holes and the position thereof matches the position of the memory card metal plate, each of the terminal slots is engageably mounted with a metallic terminal having one end being positioned at the terminal actuating hole and being bent flexibly, and having the other end of the metallic terminal passing through the housing to form into a connector.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
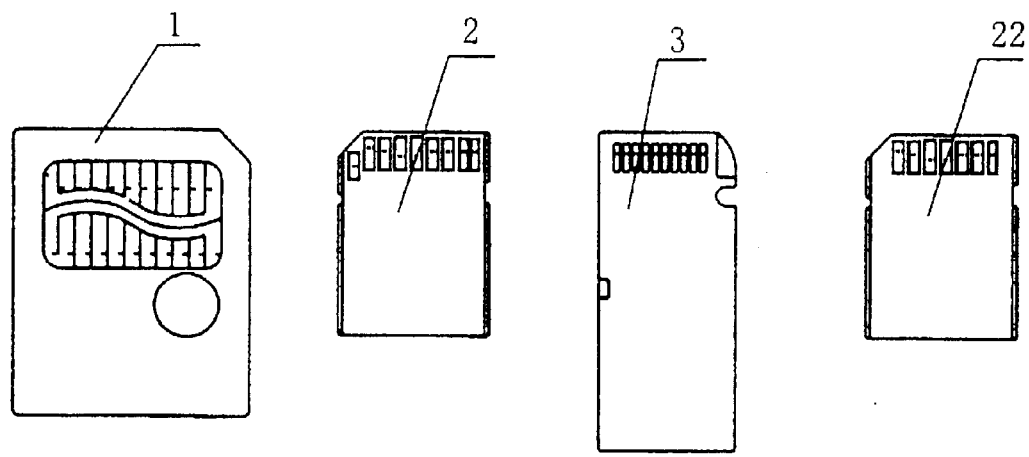
FIG. 1 is a schematic view showing various types of memory cards.
Figure 2:
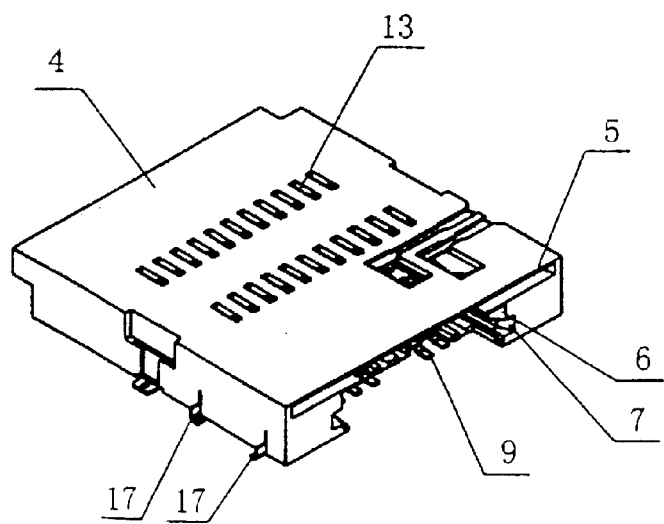
FIG. 2 is a perspective view of the connector in accordance with the present invention.
Figure 3:
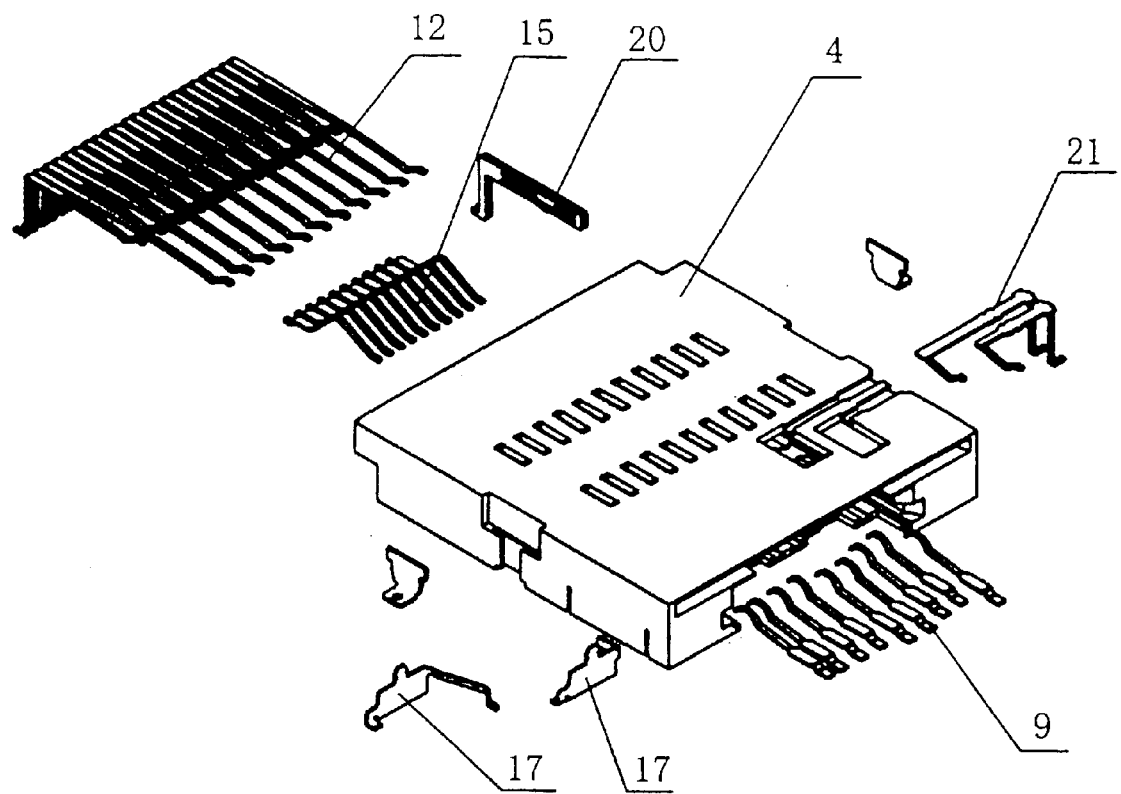
FIG. 3 is an exploded perspective view of the preferred embodiment in accordance with the present invention.
Figure 4:
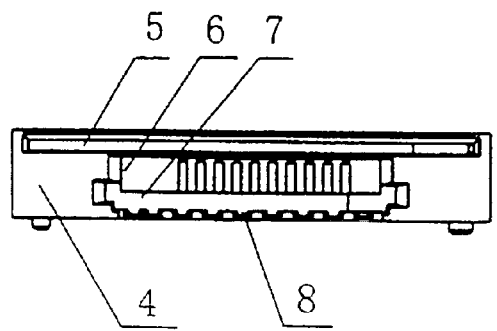
FIG. 4 is a main view of the housing of the connector of FIG. 3 of the present invention.
Figure 5:
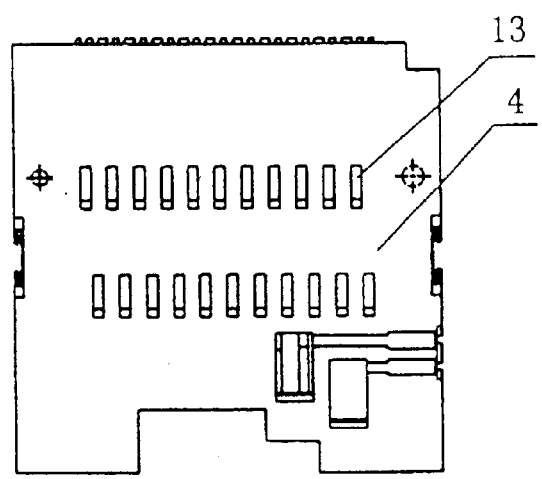
FIG. 5 is a top view of FIG. 4 of the present invention.
Figure 6:
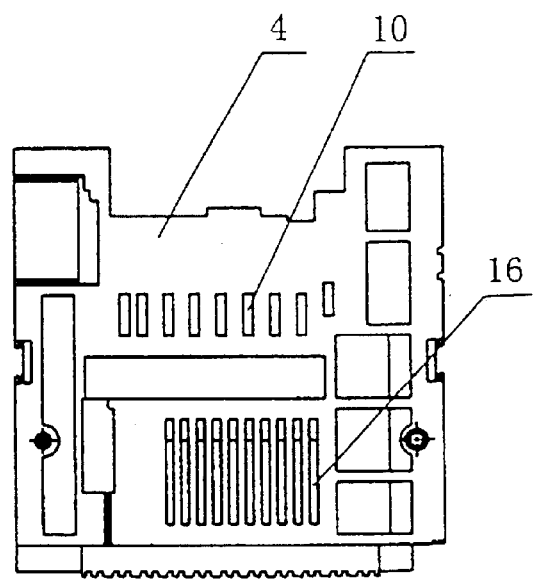
FIG. 6 is a bottom view of FIG. 4 of the present invention.
Figure 7:
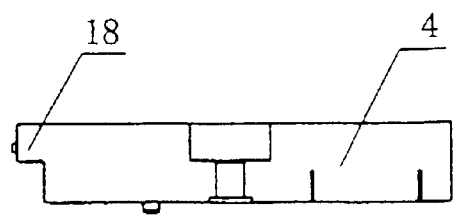
FIG. 7 is a left side view of FIG. 4 of the present invention.
Figure 8:
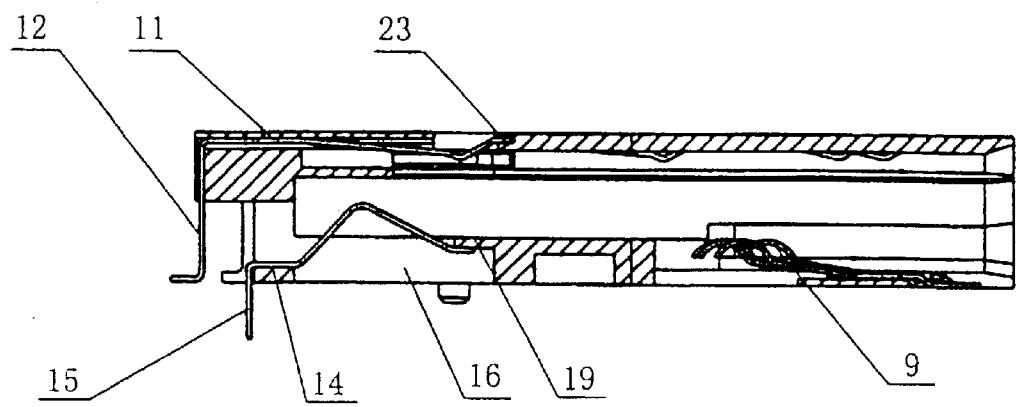
FIG. 8 is an enlarged schematic view of the preferred embodiment of the present invention.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1 through 10, there is shown a multi-memory card connector comprising a housing 4 made of plastic material or the like and having a front end provided with a slot, wherein the top and bottom of the slot have different widths, and forming into three memory insertion slots and indicated as A slot 5, B slot 6, C slot 7. The front end of the lower wall of the housing is provided with a plurality of regularly spaced front terminal slots 8, having the bottom portion being a terminal actuating hole 10. The lower and the upper wall of the rear end of the housing 4 are respectively provided with regularly spaced upper terminal slots 11 and lower terminal slots 14. The upper section of the upper terminal slot 11 and the housing below the lower terminal slot 14 are provided with corresponding terminal actuating holes 13, 16. These holes 13, 16 are provided with a top face, the upper terminal slot 11 and the lower terminal slot 14 are respectively extended backward and opened at the rear lateral wall of the housing 4. The two lateral sides of the upper slot of the housing 4 corresponding to the control bit of the individual memory card, are provided with elastic switch connected to the pin slot bit.

Each of the front terminal slots 8 is engageably mounted with a front terminal 9, and one end thereof at the terminal actuating hole 10 is formed into an arch-shaped elastic contact. The other end is protruded from the front terminal slot 8 forming into a connection pin. Each of the upper terminal slots 11 is engageably mounted with an upper terminal 12 having one end corresponding to the terminal actuating hole 13, being formed into an elastic contact point. The other end is extended from the rear wall of the housing 4 and bends at a right angle to form the connection pin. Due to the fact that the upper terminal 12 is used for the connection of the SM card 1, the upper terminal 12 is divided into a long and a short terminal. One end of the lower terminal 15 corresponds to the terminal actuating hole 16 to form a bent elastic contact point, the other end is protruded from the rear wall of the housing 4 and is bent into a connection leading pin. The terminal actuating holes 13, 16 corresponding to the upper terminal 12 and the lower terminal 15 are respectively provided with a top face 19, 23. The ends of the upper terminal 12 and the lower terminal 15 are respectively engaged at the top face 19, 23. Within the slot of the two lateral sides of the housing 4, elastic switch connection pins 17, 20 and the elastic plate 21 are provided. The two elastic switch connection pins 17 are formed into a switch such that when a memory card is inserted the corresponding elastic plate is pushed to contact with the other connection pin such that the switch is closed.

In the present preferred embodiment, the rear wall of the housing 4 is extended backward to form a protrusion. The upper terminal 12 is extended out from the rear wall and is bent at a right angle to form a connection leading pin. The lower terminal 15 is extended from the lower portion of the rear wall and is bent at a right angle to form an insertion-type connection pin such that the leading pin of the upper terminal and that of the lower terminal are formed into two separate, so as to correspond to the memory card, forming two rows of leading pins. The leading pin of the front terminal 9 and the upper terminal 12 are an adhesion-type connection structure. The leading pin position of the lower terminal 15 is positioned at the inner side of the upper terminal leading pin and is an insertion-type connection structure.

The bottom portions of the slots at respective layers are provided with position-limiting protrusions to match with the reverse-side insertion of the memory card.

Figure 9:
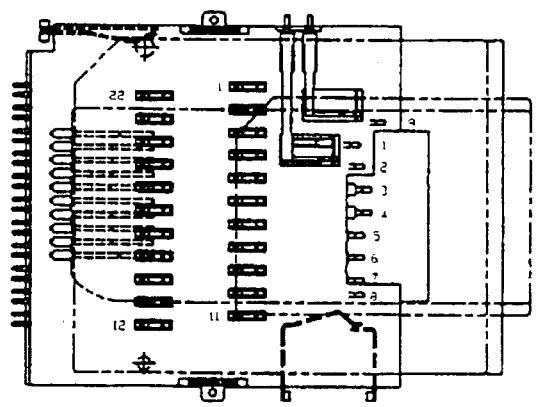
FIG. 9 is schematic view of the preferred embodiment inserted with various memory cards.
Figure 10:
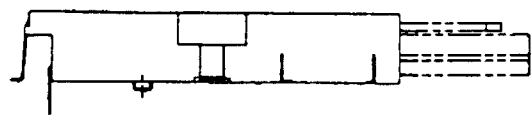
FIG. 10 is a bottom view of FIG. 9 of the present invention.

Referring to FIGS. 9 and 10, if a SM card 1 is inserted into a slot 5, the read/write metal surface of the card 1 is in contact with the elastic contact of the upper terminal 12, and the lateral edge causes the corresponding elastic switch connection pin 20 to contact. At the same time, the elastic plate 21 at the top face of the housing 4 is in contact with the metal contact of the SM card 1, so as to proceed with read/write. B slot 6 is for the MS 3 insertion, the read/write end of the MS 3 is elastically in contact with the lower terminal 15. Next, C slot 7 is for the insertion of SD card 2 (MMC 22), so that when the card 2 is inserted, the read/write metal surface is in contact with the elastic contact of the front terminal 9. At the same time, the lateral edge of the SD card 2 urges the elastic switch connection pin 17 such that the read/write switch is in contact to enable conduction. When the card 2 is located at the write prevention bit, the lateral edge at the connection pin 17 is a recess, and if the SD card is inserted, the elastic switch connection pin is not in conduction and therefore, it is at write prevention mode.

The advantage of the present invention is that due to the simple structure; the fabrication process is simple and therefore, the cost of production is low. Another advantage is that the size is small and various types of memory cards can be read. A further advantage is that the pins are for a part and therefore, short circuiting is avoided.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A multi-memory card connector having a housing, wherein a font end of the housing is provided with a slot, an upper portion and a lower section of the slot have a different width forming into three memory card insertion slot portions, an inner side of a bottom wall of the slot is provided with spaced rows of terminal slots, one end of the terminal slots is positioned at front and rear opening, another end of the terminal slots is provided with terminal actuating holes and a position thereof matches a position of a memory card metal plate, each of the terminal slots is engageably mounted with a metallic terminal having one end being positioned at the terminal actuating holes and being bent flexibly, and having another of the metallic terminal passing through the housing to form into the connector.

2. The connector of claim 1, wherein a front end of a lower wall of the housing is provided with a plurality of regularly spaced front terminal slots having a bottom portion being a terminal actuating hole, and a lower and upper wall of a rear end of the housing being respectively provided with regularly spaced upper terminal slots and lower terminal slot, and an upper section of a upper terminal slot and the housing below the lower terminal slot arc provided with corresponding terminal actuating holes.

* * * * *